United States Patent
Lin et al.

(10) Patent No.: US 9,900,558 B2
(45) Date of Patent: Feb. 20, 2018

(54) MICROSCOPE MODULE AND MICROSCOPE DEVICE

(71) Applicant: Aidmics Biotechnology Co., Ltd., New Taipei (TW)

(72) Inventors: Cheng-Ming Lin, New Taipei (TW); Shu-Sheng Lin, New Taipei (TW); Chang-Yu Chen, New Taipei (TW); Tsun-Chao Chiang, New Taipei (TW)

(73) Assignee: AIDMICS BIOTECHNOLOGY CO., LTD., New Taipei (TW)

( * ) Notice: Subject to any disclaimer, the term of this patent is extended or adjusted under 35 U.S.C. 154(b) by 209 days.

(21) Appl. No.: 14/921,494

(22) Filed: Oct. 23, 2015

(65) Prior Publication Data
US 2016/0116725 A1    Apr. 28, 2016

(30) Foreign Application Priority Data

Oct. 24, 2014 (TW) .............................. 103136848 A (51) Int. Cl.
| | |
|---|---|
| *H04N 7/18* | (2006.01) |
| *H03M 7/00* | (2006.01) |
| *G02B 6/00* | (2006.01) |
| *G02B 5/02* | (2006.01) |
| *G02B 21/34* | (2006.01) |
| *F21V 8/00* | (2006.01) |
| *G02B 21/08* | (2006.01) |
| *G02B 21/36* | (2006.01) |

(52) U.S. Cl.
CPC ............ *H04N 7/18* (2013.01); *G02B 5/0278* (2013.01); *G02B 6/0001* (2013.01); *G02B 21/086* (2013.01); *G02B 21/34* (2013.01); *G02B 21/36* (2013.01)

(58) Field of Classification Search
None
See application file for complete search history.

(56) References Cited

U.S. PATENT DOCUMENTS

| | | | | |
|---|---|---|---|---|
| 2004/0066553 A1* | 4/2004 | Gilbert | ................. | G02B 21/086 359/392 |
| 2010/0033811 A1* | 2/2010 | Westphal | ............. | G02B 21/244 359/368 |

(Continued)

FOREIGN PATENT DOCUMENTS

| | | |
|---|---|---|
| CN | 2643335 Y | 9/2004 |
| CN | 1581522 A | 2/2005 |
| JP | 2005-514632 A | 5/2005 |

*Primary Examiner* — Reza Aghevli
(74) *Attorney, Agent, or Firm* — Muncy, Geissler, Olds & Lowe, P.C.

(57) ABSTRACT

A microscope module includes a light source assembly, a sampling assembly and a diffusing element. The light source assembly includes a light source and a light guide element. The light source is disposed close to the light incidence end of the light guide element. The sampling assembly includes a cover and a base. The cover and the base are combined to define a sample accommodating space, which is located at the light exit end of the light guide element. The diffusing element is disposed between the light source and the sample accommodating space. The light emitted from the light source passes through the diffusing element and then enters the sample accommodating space. A microscope device containing the microscope module is also disclosed.

20 Claims, 8 Drawing Sheets

(56) References Cited

U.S. PATENT DOCUMENTS

| | | | |
|---|---|---|---|
| 2010/0208054 A1* | 8/2010 | Farr | A61B 1/00103 348/80 |
| 2012/0127569 A1* | 5/2012 | Mizuta | G02B 21/22 359/385 |
| 2012/0201047 A1* | 8/2012 | Paulus | G02B 21/086 362/602 |
| 2014/0168405 A1 | 6/2014 | Wo et al. | |
| 2014/0267672 A1* | 9/2014 | Morrison | G01N 21/6458 348/79 |
| 2015/0260971 A1* | 9/2015 | Paulus | G02B 21/082 359/385 |

\* cited by examiner

MICROSCOPE MODULE AND MICROSCOPE DEVICE

CROSS REFERENCE TO RELATED APPLICATIONS

This Non-provisional application claims priority under 35 U.S.C. § 119(a) on Patent Application No(s). 103136848 filed in Taiwan, Republic of China on Oct. 24, 2014, the entire contents of which are hereby incorporated by reference.

BACKGROUND OF THE INVENTION

Field of Invention

The present invention relates to a microscope module and a microscope device.

Related Art

A microscope cooperated with a slide glass or a cell counter is a traditional device for measuring cells and bio-specimen in basic biology, biomedical research, medical diagnostics and materials science. In general, the microscope includes a base, an arm disposed on the base, and a limb top disposed at the top end of the arm for carrying objectives. A revolving nose piece carrying a plurality of objectives is installed under the limb top. A stage is disposed below the revolving nose piece, and the revolving nose piece is rotatable to align one of the objectives to the stage. Accordingly, the operator can observe the detailed structure of the sample placed on the state through the eyepiece(s). This conventional microscope has the amplification and focus adjustment functions. However, the mechanism of the conventional microscope is usually complex and is not easily carried. Moreover, the operator should have a professionally training before operation, and the operation of the conventional microscope is mostly carried out in the laboratory. That is, a non-professional person is not suitable to operate the microscope.

Therefore, the portable microscope module is invented to solve the above problem. For example, the portable microscope module can be cooperated with the image capturing module of any portable electronic device, such as the cell phone, tablet computer, camera or laptop computer. In practice, the microscope module is installed at the outside of the lens of the image capturing module. The microscope module has a lens assembly. When the microscope module is installed on the portable electronic device, the lens assembly is located close to the portable electronic device while the sample is placed at the other side of the lens assembly. As the light is emitted to the sample, the operator can observe the sample (e.g. cells or specimens) through the image capturing module of the portable electronic device.

As mentioned above, the microscope module needs additional light source. However, the light emitted from the external light source can cause a shadow of the sample. If the light source is installed inside the microscope module, the light emitted to the sample is not uniform. In more detailed, the center of the sample is brighter than the edge part of the sample.

SUMMARY OF THE INVENTION

In view of the foregoing subject, an objective of the present invention is to provide a portable microscope module and a portable microscope device, which can solve the problems of insufficient light brightness, undesired shadow and non-uniform of light, thereby further improving the image quality.

To achieve the above objective, the present invention discloses a microscope module including a light source assembly, a sampling assembly and a diffusing element. The light source assembly includes a light source and a light guide element. The light source is disposed close to the light incidence end of the light guide element. The sampling assembly includes a cover and a base. The cover and the base are combined to define a sample accommodating space, which is located at the light exit end of the light guide element. The diffusing element is disposed between the light source and the sample accommodating space. The light emitted from the light source passes through the diffusing element and then enters the sample accommodating space.

To achieve the above objective, the present invention also discloses a microscope device including a microscope module, an image capturing module and a lens assembly. The microscope module includes a light source assembly, a sampling assembly and a diffusing element. The light source assembly includes a light source and a light guide element. The light source is disposed close to the light incidence end of the light guide element. The sampling assembly includes a cover and a base. The cover and the base are combined to define a sample accommodating space, which is located at the light exit end of the light guide element. The diffusing element is disposed between the light source and the sample accommodating space. The light emitted from the light source passes through the diffusing element and then enters the sample accommodating space. The lens assembly includes at least a lens and a housing. The housing has an opening corresponding to the sample accommodating space, and the lens is disposed in the opening. The image capturing module includes a lens unit and a processing unit. The lens unit is aligned and cooperated with the lens for capturing a sampling image. The processing unit is coupled to the lens unit for receiving the sampling image and executing an image processing procedure.

In one embodiment, the light guide element has a first chamber, and the diffusing element is disposed in the first chamber of the light guide element.

In one embodiment, the light guide element is a solid rod, and the diffusing element is disposed at the light incidence end or the light exit end of the light guide element.

In one embodiment, the diffusing element is an optical lens, and the diffusing element is connected to the light source.

In one embodiment, the microscope module further includes a lens assembly, which includes at least a lens and a housing. The housing has an opening corresponding to the sample accommodating space, and the lens is disposed in the opening.

In one embodiment, the housing and the light source assembly are combined to form a second chamber, and the sampling assembly and the diffusing element are disposed in the second chamber.

In one embodiment, the cover of the sampling assembly has a cup shape with a receiving space, and the base is at least partially disposed in the receiving space.

In one embodiment, the cover and the base are coaxial to be telescoped with each other.

In one embodiment, the base also has a cup shape and is engaged in the receiving space of the cover so as to define the sample accommodating space.

In one embodiment, the sampling assembly further comprises a microstructure disposed between the cover and the base.

As mentioned above, the microscope module and microscope device of the invention have a sampling assembly for easily retrieving the sample by the base directly and then placing the sample in the sample accommodating space defined by the cover and the base. The light source is disposed close to the light incidence end of the guide element. This configuration can solve the insufficient light issue caused by the external light source. In addition, the diffusing element is disposed between the light source and the sample accommodating space, so that the light emitted from the light source can travel through the diffusing element and then be uniformly emitted to the sample accommodating space. This configuration can prevent the non-uniform brightness distribution and avoid the problems of the shadow and partially insufficient light caused by the sample. Moreover, the microscope module can be cooperated with the image capturing module of the portable electronic device so as to further improve the image quality.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
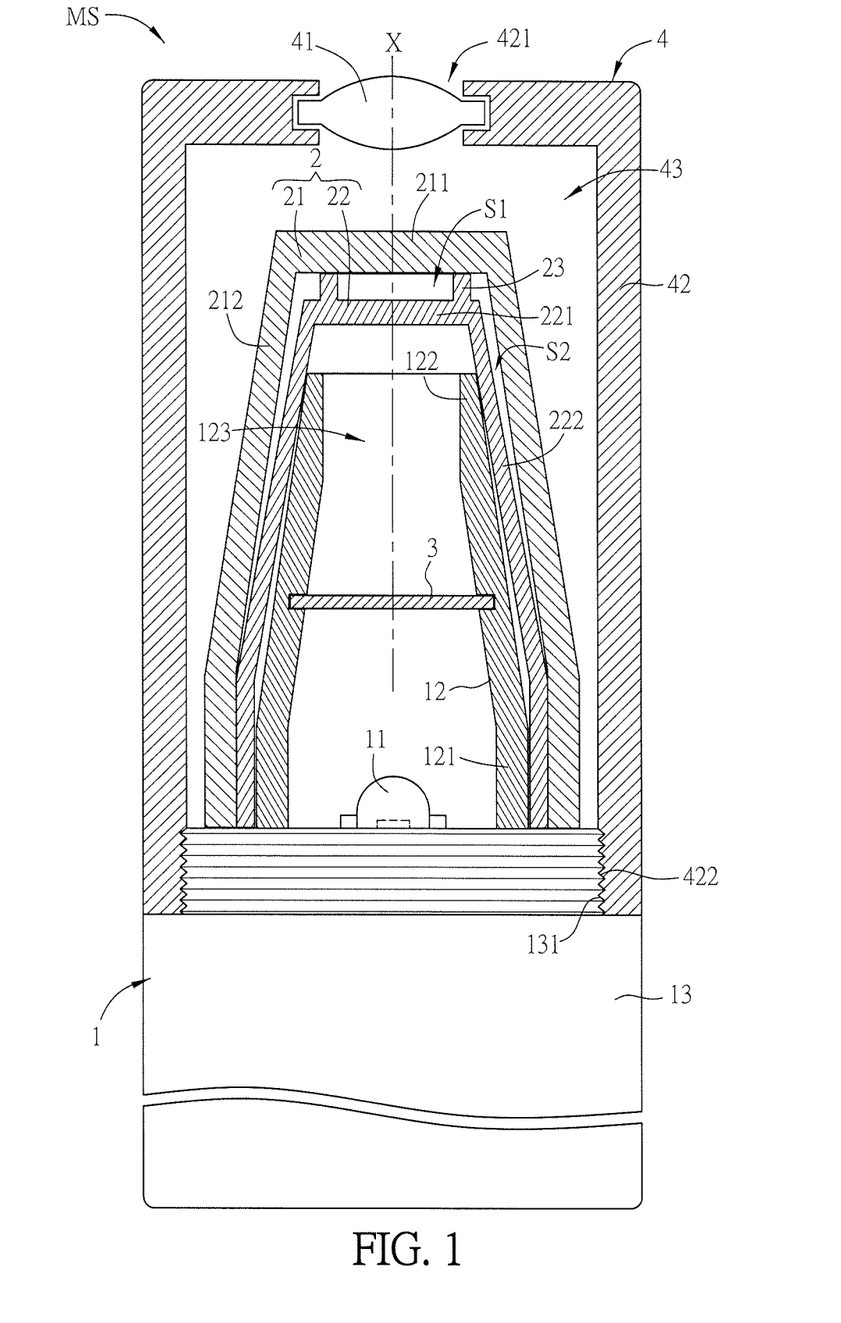
FIG. 1 is a sectional view of a microscope module according to an embodiment of the invention.
Figure 2:
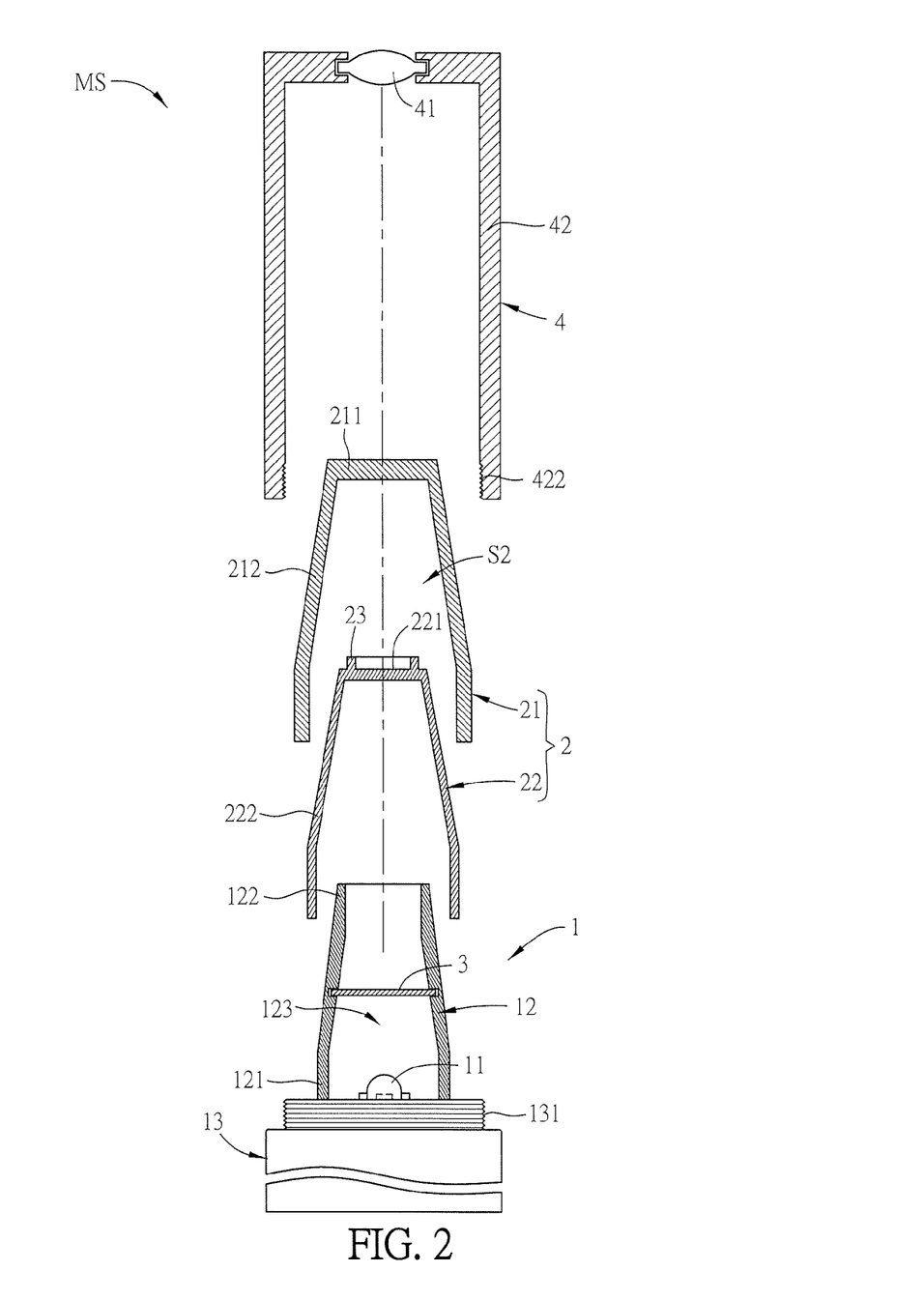
FIG. 2 is an exploded view of the microscope module of FIG. 1.

FIG. 1 is a sectional view of a microscope module according to an embodiment of the invention, and FIG. 2 is an exploded view of the microscope module of FIG. 1. With reference to FIGS. 1 and 2, the microscope module MS of this embodiment includes a light source assembly 1, a sampling assembly 2 and a diffusing element 3.

The light source assembly 1 has a light source 11 and a light guide element 12. The light source 11 is disposed close to the light incidence end 121 of the light guide element 12. The light emitted from the light source 11 passes through the light guide element 12 and is then guided to the light exit end 122 of the light guide element 12. In this case, the light source 11 includes an LED, a laser diode or a fluorescent lamp, and the wavelength of light emitted from the light source 11 can be visible light (e.g. fluorescent light) or invisible light (IR light).

The sampling assembly 2 is made of a transparent material and includes a cover 21 and a base 22. The cover 21 and the base 22 are combined to define a sample accommodating space S1, which is located at the light exit end 122 of the light guide element 12 for storing the sample.

The diffusing element 3 is disposed between the light source 11 and the sample accommodating space S1. The light emitted from the light source 11 passes through the diffusing element 3 and then enters the sample accommodating space S1. After traveling through the diffusing element 3, the light emitted from the light source 11 becomes more uniform. Thus, the sample accommodating space S1 as well as the sample disposed in the sample accommodating space S1 can be irradiated by the uniform light. The detailed features and operations of the components of the microscope module MS will be further described hereinafter.

At first, the sampling assembly 2 is used to contact and retrieve the sample, such as natural substance, animal cells or plant cells. The sampling assembly 2 is composed of a cover 21 and a base 22, which have coordinated structures. For example, the cover 21 and the base 22 have the same center axis x (see FIG. 1), so that the cover 21 and the base 22 can be telescoped with each other. In this embodiment, the cover 21 and the base 22 have similar shapes (e.g. a cup shape). When the cover 21 is telescoped on the base 22, the cover 21 and the base 22 are axially aligned. In more detailed, the cover 21 of the embodiment has a first top portion 211 and a first side wall portion 212, which extends from the edge of the first top portion 211. That is, the first side wall portion 212 is disposed around the first top portion 211 so as to form a cup structure having a receiving space S2. The base 22 has a second top portion 221 and a second side wall portion 222, which extends from the edge of the second tip portion 221 so as to from a cup structure. The shapes of the first top portion 211 and the second top portion 221 can be a planar circle or polygon so as to form the cup structure of different shapes. In this embodiment, the shapes of the first top portion 211 and the second top portion 221 is a planar circle. The light exit end of the cover 21 is larger than the light incidence end thereof, and the base 22 has similar structure. Accordingly, when the cover 21 and the base 22 are telescoped, the second top portion 221 of the base 22 can be engaged in the receiving space S2 of the cover 21, thereby defining the sample accommodating space S1. In addition, the perimeter of the first top portion 211 is larger than that of the second top portion 221, so that the base 22 can be telescoped in the cover 21 and located in the receiving space S2. In this case, the base 22 is at least partially disposed in the receiving space S2 of the cover 21 so as to define the sample accommodating space S1.

In this embodiment, when the cover 21 and the base 22 are telescoped with each other, the base 22 is engaged within the receiving space S2 of the cover 21. The cover 21 and the base 22 are designed as a cup structure. In practice, the outer diameter of the opening of the second side wall portion 222 is substantially equal to the inner diameter of the opening of the first side wall portion 212 (see FIG. 1), so that the base 22 can be perfectly received in the receiving space S2 of the cover 21. In other embodiments, the openings of the first side wall portion 212 and the second side wall portion 222 have coordinated structures (e.g. a pair of corresponding protrusion and recess), which can be engaged with each other. The coordinated structures of this invention are not limited. Preferably, the distance between the first top portion 211 and the second top portion 221 ranges from 0.1 μm to 500 μm, and the thickness therebetween ranges from 100 μm to 1000 μm.

In addition, the sampling assembly 2 of this embodiment may further include a microstructure 23 disposed between the cover 21 and the base 22. The microstructure 23 can be disposed on the cover 21 or the base 22, and this embodiment is not limited. In other words, the microstructure 23 can be disposed on one side of the cover 21 facing the sample accommodating space S1, or it can be disposed on one side of the base 22 facing the sample accommodating space S1. In this embodiment, the microstructure 23 is a flange structure disposed on the edge of the second top portion 221 facing the sample accommodating space S1. In other words, the microstructure 23 is disposed around the edge of the second top portion 221. Accordingly, when the cover 21 and the base 22 are telescoped with each other, the microstructure 23 can assist to define the sample accommodating space S1.

Figure 3:
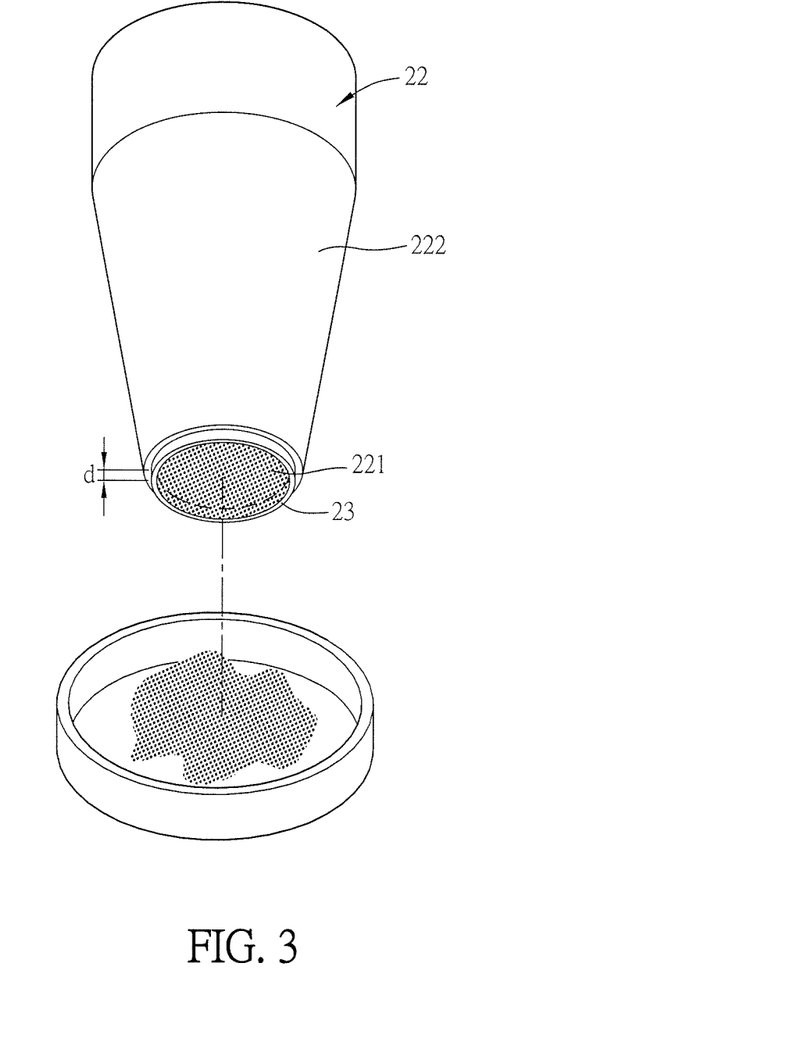
FIG. 3 is a schematic diagram showing the sampling operation with the base of FIG. 1.

FIG. 3 is a schematic diagram showing the sampling operation with the base of FIG. 1. As shown in FIG. 3, the sampling operation includes the step of directly using the second top portion 221 of the base 22 to contact the sample or dipping the second top portion 221 into the liquid sample. Accordingly, the sample can be directly absorbed on the outer surface of the second top portion 221 due to the surface tension of the sample. Since the microstructure 23 is configured at the edge of the second top portion 221, the collected sample can be prevented from exposing. Besides, the structure and position of the microstructure 23 can further determine the collected volume of the sample. Preferably, the thickness d of the microstructure 23 is between 0.1 μm and 500 μm, and the area of the microstructure 23 formed on the second top portion 221 is roughly equal to the cross-sectional area of the sample accommodating space S1, which ranges from 50 mm$^2$ to 400 mm$^2$. Of course, in other embodiments, the microstructure 23 can be a plurality of discontinuous protrusions disposed on the cover 21 or the base 22. This configuration can also achieve the function of assisting to define the sample accommodating space S1, and this invention is not limited thereto.

Figure 4:
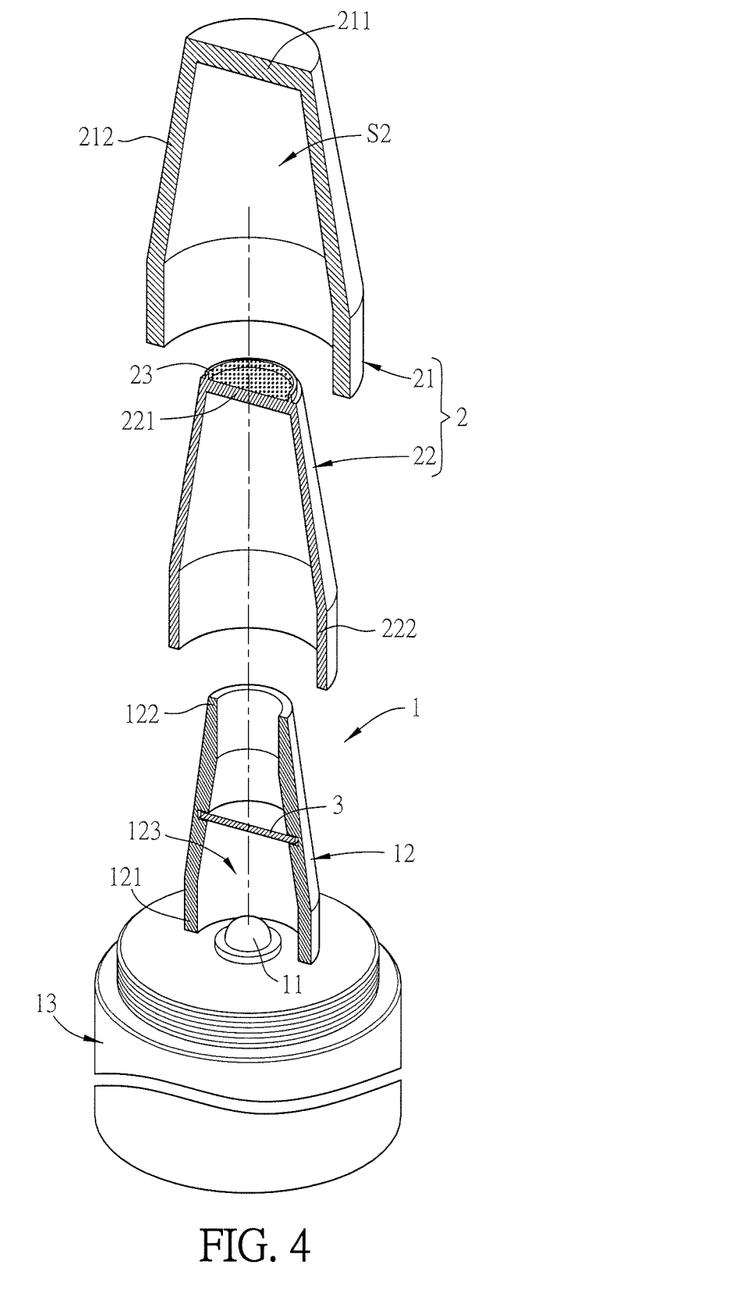
FIG. 4 is a sectional view of the sampling assembly and the light source assembly of FIG. 1.

FIG. 4 is a sectional view of the sampling assembly and the light source assembly of FIG. 1. Referring to FIGS. 1 and 4, after the sampling operation by the base 22, the cover 21 and the base 22 are telescoped to form the sampling assembly 2. In this moment, the collected sample is restricted within the sample accommodating space S1 (see FIG. 1) defined by the first top portion 211, the second top portion 221 and the microstructure 23. This configuration can prevent the pollution or leakage of the collected sample in the sampling assembly 2. Afterwards, the base 22 of the sampling assembly 2 is telescoped on the light guide element 12 of the light source assembly 1. In this case, the inner side of the base 22 is engaged with the light guide element 12, while the outer side of the base 22 is engaged with the cover 21. Of course, in practice, it is possible to telescope the base 22 on the light guide element 12 and then hold the bottom of the light source assembly 1 to perform the sampling procedure with the base 22. To be noted, the light source assembly 1 may further include a base 13. The base 13 may have a chamber for accommodating the power supply of the light source 11. Besides, the base 13 can be designed with a proper shape, which allows the operator to hold for sampling operation. After the sampling operation, the cover 21 is telescoped on the base 22. In this case, the distance between the light source 11 and the second top portion 221 ranges from 0.1 cm to 10 cm. Accordingly, the light emitted from the light source 11 of the light source assembly 1 can be guided by the light guide element 12 to the sample accommodating space S1 for irradiating the sample.

Referring to FIGS. 1 and 4, the light guide element 12 has a first chamber 123. In practice, the light guide element 12 of this embodiment is a hollow tube, and the diffusing element 3 is disposed in the first chamber 123. The light source 11 is disposed in the first chamber 123 and located close to the light incidence end 121. The light incidence end 121 of the light guide element 12 is connected to the base 13. The light exit end 122 has an opening structure towards the sample accommodating space S11. Accordingly, the light emitted from the light source 11 can enter the light guide element 12 through the light incidence end 121, pass through the diffusing element 3 and the light exit end 122, and then reach the sample accommodating space S1. In this embodiment, the diffusing element 3 can be a diffuser film or a diffuser plate, and this invention is not limited. The diffusing element 3 is disposed between the light source 11 and the sample accommodating space S1. The inner side wall of the light guide element 12 is configured with a recess structure for placing the diffusing element 3, so that the diffusing element 3 can be disposed within the first chamber 123. In practice, the diffusing element 3 is substantially perpendicular to the inner side wall of the light guide element 12. Of course, the included angle between the diffusing element 3 and the inner side wall of the light guide element 12 is not limited, and any configuration that allows the diffusing element 3 to be disposed in the first chamber 123 of the light guide element 12 and makes the light emitted from the light source 11 to be transmitted to the diffusing element 3 before entering the sample accommodating space S1 is applicable. The diffusing element 3 can diffuse the light emitted from the light source 11 so as to generate a uniform area light source. In this case, the light source 11 is a point light source (e.g. a LED). Accordingly, after the light emitted from the light source 11 passes through the diffusing element 3, the uniform light source can be generated and then enter the sample accommodating space S1. This configuration can prevent the problem of non-uniform light brightness.

Figure 5:
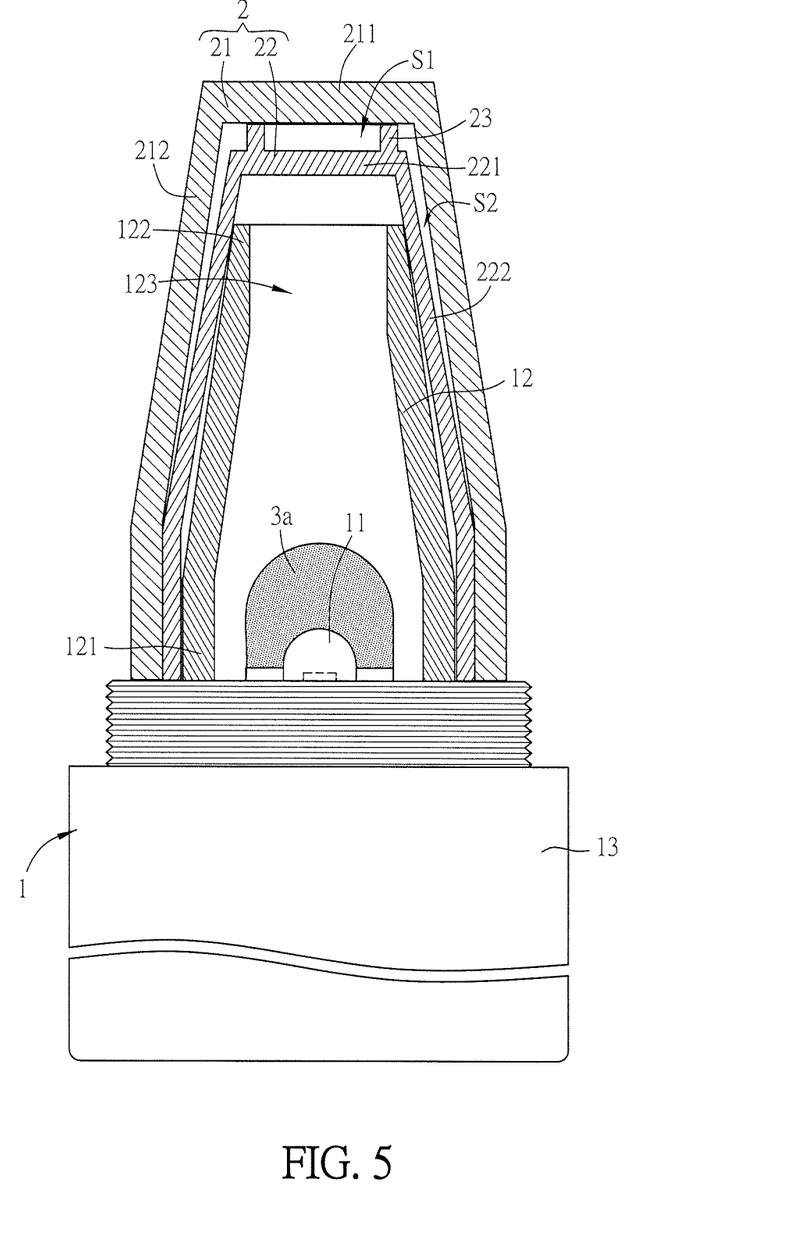
FIG. 5 is a schematic diagram showing another aspect of the diffusing element.

FIG. 5 is a schematic diagram showing another aspect of the diffusing element. To be noted, FIG. 5 shows a modified aspect of a diffusing element 3a, so the reference numbers of the components of the light source assembly 1 and the sampling assembly 2 are the same as the previous embodiment. Reference to FIG. 5, the diffusing element 3a is an optical lens connected with the light source 11. In more specific, the diffusing element 3a surrounds the light source 11, so that the diffusing element 3a can cover and protect the light source 11. Accordingly, the light generated by the light source 11 enters the optical lens (the diffusing element 3a) and is then reflected for multiple times within the optical lens (the diffusing element 3a) so as to uniform the light. Afterwards, the light can be uniformly outputted from the optical lens (the diffusing element 3a) and then reach the sample accommodating space S1. This configuration can also prevent the problem of non-uniform light brightness.

Figure 6:
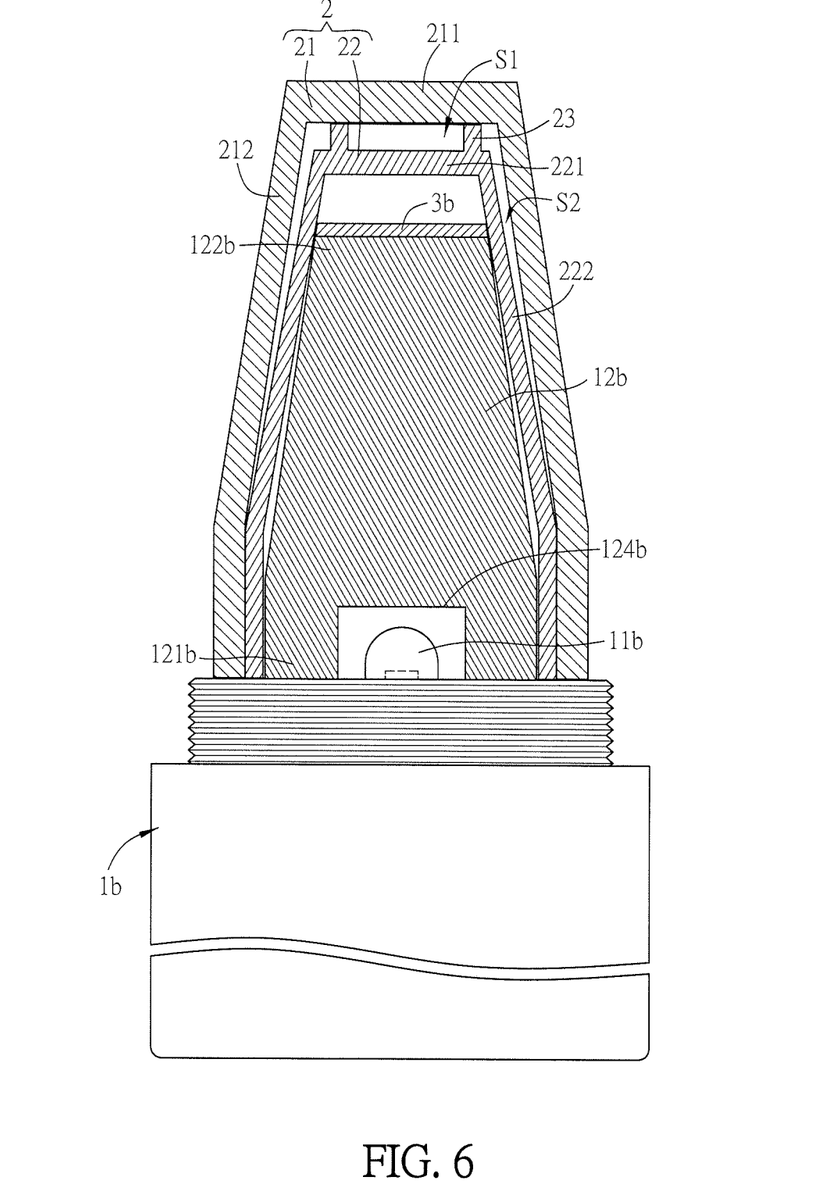
FIG. 6 is a schematic diagram showing another aspect of the light guide element.

The structure of the light guide element of this invention is also not limited. FIG. 6 is a schematic diagram showing another aspect of the light guide element. To be noted, FIG. 6 shows modified aspects of the light source assembly and the diffusing element, so the reference numbers of the components of the sampling assembly 2 are the same as the previous embodiment. Reference to FIG. 6, the light guide element 12b of the light source assembly 1b is a solid rod, which has a recess 124b located corresponding to the light source 11b for receiving the light source 11b. The diffusing element 3b can be disposed at the light incidence end 121b or the light exit end 122b of the light guide element 12b. In this embodiment, the diffusing element 3b is disposed at the light exit end 122b for example. Accordingly, the light emitted from the light source 11b can travel from the light incidence end 121b to the light exit end 122b and then enter the diffusing element 3b to generate a uniform light. The uniform light is then emitted to the sample accommodating space S1. In other embodiments, the diffusing element 3b can be embedded inside the light guide element 12b. Otherwise, the diffusing element can be formed as a U-shape (see the diffusing element 3c of FIG. 7) and disposed in the recess 124b, so that the diffusing element 3b can be disposed at the light incidence end 121b. No matter that the diffusing element 3b is located at either the light incidence end 121b or the light exit end 122b, this configuration can prevent the problem of non-uniform light brightness.

Figure 7:
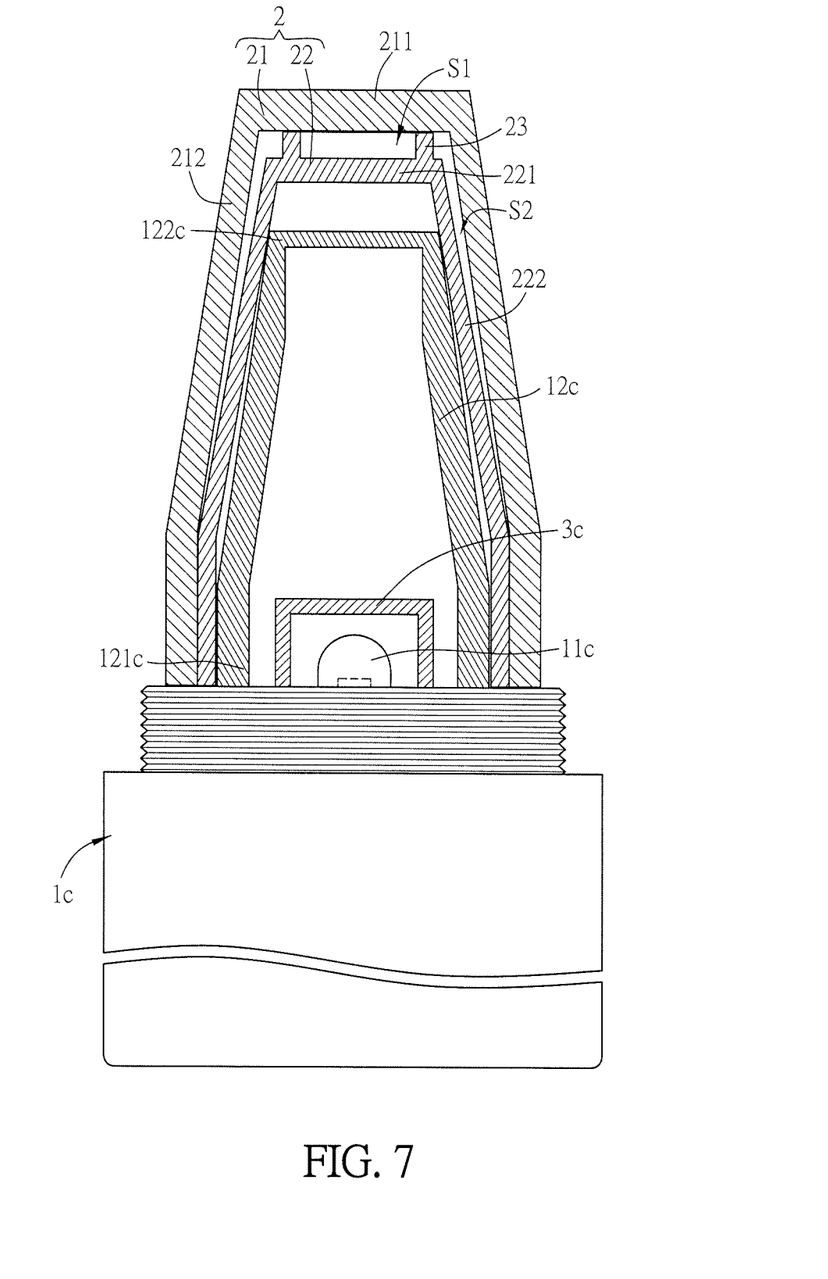
FIG. 7 is a schematic diagram showing another aspect of the light guide element.

FIG. 7 is a schematic diagram showing another aspect of the light guide element. Referring to FIG. 7, the light guide element 12c is a hollow rod, and the diffusing element 3c is disposed at the light incidence end 121c of the light guide element 12c. The diffusing element 3c has a U-shape structure and is disposed around the edge of the light source 11c, so that the light emitted from the light source 11c can pass through the diffusing element 3c to form a uniform light at the light incidence end 121c. Then, the uniform light is outputted from the light exit end 122c and enters the sample accommodating space S1 directly. In other embodiments, the diffusing element 3c can be embedded inside the hollow rod of the light guide element 12c or directly disposed at the light exit end 122c of the light guide element 12c. This invention is not limited.

In addition, the above-mentioned cover 21, base 22 and light guide element 12 (12b, 12c) are all manufactured by plastic injection molding, and the material thereof may include glass, PS, PMMA, PC, or COC (cyclic olefin copolymer). Accordingly, the manufacturing costs of the sampling assembly 2 and the light guide element 12 (12b, 12c) are very cheap.

Referring to FIG. 1 again, the microscope module MS of this embodiment further includes a lens module 4. After assembling the lens assembly 4 with the light source assembly 1 and the sampling assembly 2, the lens assembly 4 is located at the outer side of the sampling assembly 2. The lens assembly 4 includes at least one lens 41 and a housing 42. The housing 42 has an opening 421 disposed corresponding to the sample accommodating space S1, and the lens 41 is disposed in the opening 421. In more specific, the housing 42 has a hollow tube structure, so that it can telescope on the sampling assembly 2. Accordingly, the lens 41 is located at the outer side of the sampling assembly 2 corresponding to the sample accommodating space S1. One side of the housing 42 corresponding to the opening 421 has a first lock structure 422, and the base 13 of the light source assembly 1 has a corresponding second lock structure 131. That is, the first lock structure 422 and the second lock structure 131 have coordinated designs such as a pair of protrusion and recess, screw thread and hole, or hook and slot. In this embodiment, the first lock structure 422 and the second lock structure 131 are a hole and a screw thread for example. Accordingly, the housing 42 of the lens assembly 4 can be fixed to the light source assembly 1 by screwing. The housing 42 and the light source assembly 1 are combined to form a second chamber 43, and the sampling assembly 2 and the diffusing element 3 are located in the second chamber 43. The opening 421 for receiving the lens 41 is located corresponding to the sample accommodating space S1, so that the light emitted from the light source 11 can travel through the diffusing element 3 and the sample accommodating space 51 and then reach the lens 41. In this embodiment, the microscope module MS can be cooperated with the image capturing module and form an image at the image capturing module.

Figure 8:
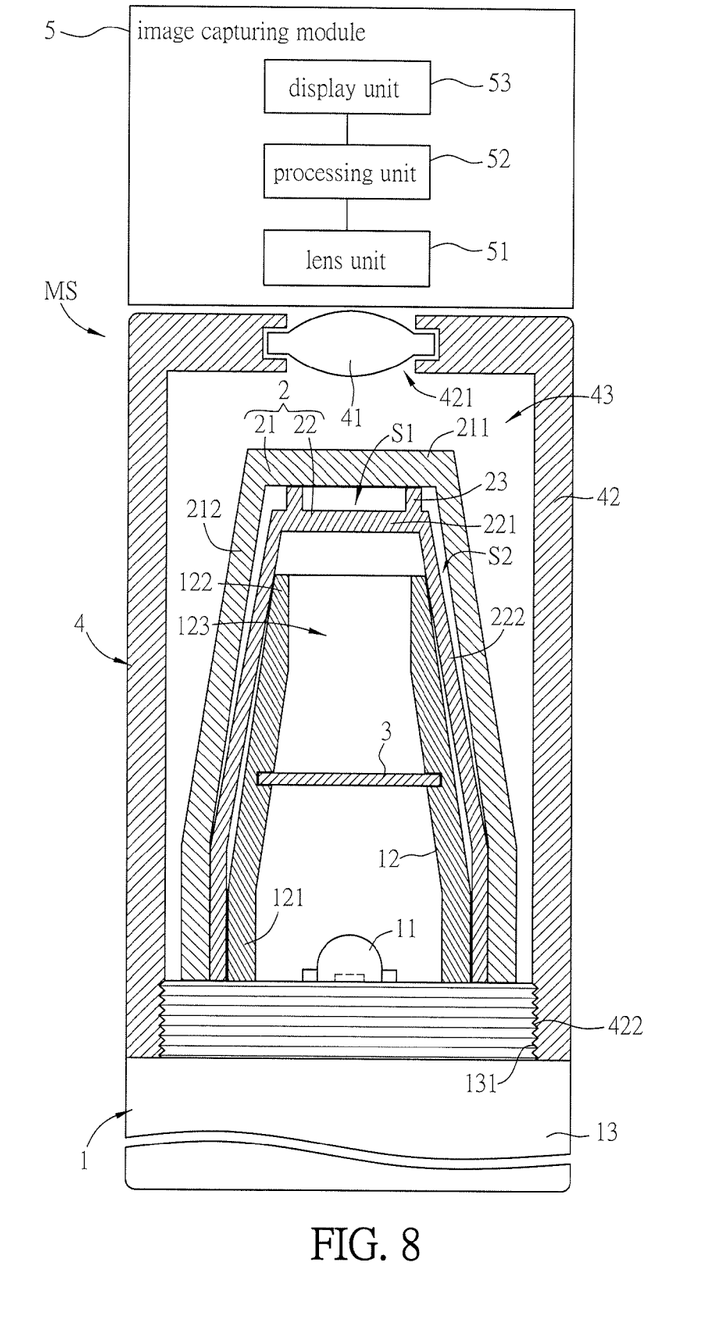
FIG. 8 is a schematic diagram showing assembled image capturing module and microscope module of FIG. 1.

FIG. 8 is a schematic diagram showing assembled image capturing module and microscope module of FIG. 1. Referring to FIG. 8, the microscope module MS is cooperated with the image capturing module 5. The image capturing module 5 can be configured in a portable electronic device with camera function such as a cell phone, tablet computer, digital camera or laptop computer. That is, the microscope module MS can be directly cooperated with the image capturing module of the portable electronic device. The microscope module MS can be fastened on the image capturing module 5 by a fixing element (e.g. the case with a fixing structure). Otherwise, the microscope module MS can be separated with the image capturing module 5, and is placed in front of the image capturing module 5 for operation. The microscope module MS can amplify the sample image and provide the amplified sample image to the image capturing module 5.

In more detailed, the image capturing module 5 includes a lens unit 51, a processing unit 52 and a display unit 53. The processing unit 52 is coupled to the lens unit 51 and the display unit 53. When the microscope module MS is assembled with the image capturing module 5, the lens 41 and the lens unit 51 are coaxially aligned. Preferably, the magnification ratio of the microscope module MS is between 0.1 and 2, and the FOV (field of view) thereof is between 0.1 mm$^2$ and 100 mm$^2$. To be noted, the magnification ratio is not limited to the above example. In one embodiment, the lens 41 and the lens unit 51 can be coordinated with each other so as to focus and amplify the image of a sample disposed in the sampling assembly 2. After the lens unit 51 captures the sampling image, the processing unit performs an image processing procedure and the display unit 53 displays the sampling image (the image amplified by the microscope module MS). Accordingly, the user can directly observes the amplified sampling image through the image capturing module 5. In other embodiments, the display unit 53 is not an essential component of the image capturing module 5. In this case, the image capturing module 5 can output the processed image data through a transmission unit, and this invention is not limited.

In addition, the invention also discloses a microscope device including a microscope module and an image capturing module. The components, technical features and connections of the microscope module can be referred to the microscope module MS of the previous embodiments, and the image capturing module can be referred to the description of the cooperation of the microscope module MS and the image capturing module 5. Thus, the detailed descriptions thereof will be omitted.

In summary, the microscope module and microscope device of the invention have a sampling assembly for easily retrieving the sample by the base directly and then placing the sample in the sample accommodating space defined by the cover and the base. The light source is disposed close to the light incidence end of the guide element. This configuration can solve the insufficient light issue caused by the external light source. In addition, the diffusing element is disposed between the light source and the sample accommodating space, so that the light emitted from the light source can travel through the diffusing element and then be uniformly emitted to the sample accommodating space. This configuration can prevent the non-uniform brightness distribution and avoid the problems of the shadow and partially insufficient light caused by the sample. Moreover, the microscope module can be cooperated with the image capturing module of the portable electronic device so as to further improve the image quality.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A microscope set, comprising:
    a light source assembly comprising a light source and a light guide element, wherein the light source is disposed close to a light incidence end of the light guide element;
    a sampling assembly comprising a cover and a base, wherein the cover and the base are combined to define a sample accommodating space located at a light exit end of the light guide element; and
    a diffusing element placed in a recess structure of an inside of the light guide element and disposed between the light source and the sample accommodating space;
    wherein, the light emitted from the light source passes through the diffusing element and then enters the sample accommodating space.

2. The microscope set of claim 1, wherein the light guide element has a first chamber, and the diffusing element and the light source are disposed in the first chamber of the light guide element.

3. The microscope set of claim 1, wherein the diffusing element is an optical lens, and the diffusing element is connected to the light source.

4. The microscope set of claim 1, further comprising:
    a lens assembly comprising at least a lens and a housing, wherein the housing has an opening corresponding to the sample accommodating space, and the lens is disposed in the opening.

5. The microscope set of claim 4, wherein the housing and the light source assembly are combined to form a second chamber, and the sampling assembly and the diffusing element are disposed in the second chamber.

6. The microscope set of claim 1, wherein the cover of the sampling assembly has a cup shape with a receiving space, and the base is at least partially disposed in the receiving space.

7. The microscope set of claim 6, wherein the cover and the base are coaxial to be telescoped with each other.

8. The microscope set of claim 6, wherein the base also has a cup shape and is engaged in the receiving space of the cover so as to define the sample accommodating space.

9. The microscope set of claim 8, wherein the sampling assembly further comprises a microstructure disposed between the cover and the base.

10. A microscope device, comprising:
    a microscope set, comprising:
    a light source assembly comprising a light source and a light guide element, wherein the light source is disposed close to a light incidence end of the light guide element,
    a sampling assembly comprising a cover and a base, wherein the cover and the base are combined to define a sample accommodating space located at a light exit end of the light guide element,
    a diffusing element placed in a recess structure of an inside of the light guide element and disposed between the light source and the sample accommodating space, wherein the light emitted from the light source passes through the diffusing element and then enters the sample accommodating space, and
    a lens assembly comprising at least a lens and a housing, wherein the housing has an opening corresponding to the sample accommodating space, and the lens is disposed in the opening; and
    an image capturing device, comprising:
    at least one lens aligned and cooperated with the lens for capturing a sampling image, and
    an image processor coupled to the lens for receiving the sampling image and executing an image processing procedure.

11. The microscope device of claim 10, wherein the light guide element has a first chamber, and the diffusing element and the light source are disposed in the first chamber of the light guide element.

12. The microscope device of claim 10, wherein the diffusing element is an optical lens, and the diffusing element is connected to the light source.

13. A microscope set, comprising:
    a light source assembly comprising a light source and a light guide element, wherein the light source is disposed close to a light incidence end of the light guide element;
    a sampling assembly comprising a cover and a base, wherein the cover and the base are combined to define a sample accommodating space located at a light exit end of the light guide element; and
    a diffusing element covering and surrounding the light source, and disposed between the light source and the sample accommodating space;
    wherein, the light emitted from the light source passes through the diffusing element and then enters the sample accommodating space.

14. The microscope set of claim 13, wherein the light guide element has a first chamber, and the diffusing element and the light source are disposed in the first chamber of the light guide element.

15. The microscope set of claim 13, further comprising:
    a lens assembly comprising at least a lens and a housing, wherein the housing has an opening corresponding to the sample accommodating space, and the lens is disposed in the opening.

16. The microscope set of claim 15, wherein the housing and the light source assembly are combined to form a second chamber, and the sampling assembly and the diffusing element are disposed in the second chamber.

17. The microscope set of claim 13, wherein the cover of the sampling assembly has a cup shape with a receiving space, and the base is at least partially disposed in the receiving space.

18. The microscope set of claim 17, wherein the cover and the base are coaxial to be telescoped with each other.

19. The microscope set of claim 17, wherein the base also has a cup shape and is engaged in the receiving space of the cover so as to define the sample accommodating space.

20. The microscope set of claim 19, wherein the sampling assembly further comprises a microstructure disposed between the cover and the base.

* * * * *